United States Patent
Rivard et al.

(10) Patent No.: US 6,300,953 B1
(45) Date of Patent: Oct. 9, 2001

(54) APPARATUS AND METHOD FOR GROUPING TEXTURE CACHE REQUESTS

(75) Inventors: William G. Rivard; Emmett Michael Kilgariff, both of San Jose, CA (US)

(73) Assignee: nVidia, Santa Clara, CA (US)

( * ) Notice: Subject to any disclaimer, the term of this patent is extended or adjusted under 35 U.S.C. 154(b) by 0 days.

(21) Appl. No.: 09/173,586

(22) Filed: Oct. 15, 1998

(51) Int. Cl.[7] .................................................. G09G 5/00
(52) U.S. Cl. .......................... 345/430; 345/509; 345/521
(58) Field of Search ................................... 345/430, 423, 345/425, 427, 428, 429, 431, 508, 513, 515, 506, 501, 509, 521, 418, 419, 192, 507, 186; 711/129, 170, 5; G09G 5/00

(56) References Cited

U.S. PATENT DOCUMENTS

| | | |
|---|---|---|
| 5,706,481 | 1/1998 | Hannah et al. . |
| 5,740,343 | 4/1998 | Tarolli et al. . |
| 5,757,376 | 5/1998 | Suzuoki et al. . |
| 5,760,783 * | 6/1998 | Migdal ................................. 345/430 |
| 5,821,944 * | 8/2000 | Watkins ............................... 345/430 |
| 5,828,382 * | 10/1998 | Wilde .................................. 345/430 |
| 5,886,705 * | 3/1999 | Lentz .................................. 345/430 |
| 5,905,509 * | 5/1999 | Jones .................................. 345/520 |
| 5,977,977 * | 11/1999 | Kajiya ................................. 345/418 |
| 5,987,567 * | 11/1999 | Rivard ................................. 345/430 |
| 6,002,407 * | 12/1999 | Fadden ................................ 345/430 |
| 6,002,410 * | 12/1999 | Battle ................................. 345/430 |
| 6,005,582 * | 12/1999 | Gabriel ............................... 345/430 |
| 6,011,565 * | 1/2000 | Kno .................................... 345/430 |
| 6,040,837 * | 3/2000 | Wong ................................. 345/430 |
| 6,104,415 * | 8/2000 | Gossett .............................. 345/430 |

* cited by examiner

Primary Examiner—Matthew Luu
Assistant Examiner—Wesner Sajous
(74) Attorney, Agent, or Firm—Kevin J. Zilka

(57) ABSTRACT

A method and apparatus for grouping texture data to increase storage throughput. Texels are addressed and stored according to adjacency to enable retrieval of a plurality of texels (a cache entry) with only a single address space request. Individual texel position is then derived using a simple adjacency formula. The preferred method and apparatus are compatible with both tiled data and linear data storage formats.

20 Claims, 10 Drawing Sheets

APPARATUS AND METHOD FOR GROUPING TEXTURE CACHE REQUESTS

FIELD OF THE INVENTION

The present invention relates generally to the field of image processing and synthesis, and more particularly to an apparatus and method for caching texture map information to enable rapid generation of graphics images.

BACKGROUND OF THE INVENTION

Computer systems such as personal computers and stand-alone video games are commonly used for displaying graphical objects on a display screen. These graphical objects include points, lines, polygons, and three dimensional objects. By utilizing texture mapping techniques, color and other details can be applied to areas and surfaces of graphical objects. In texture mapping, a pattern image, also referred to as a "texture map," is combined with an area or surface of an object to produce a modified object with the added texture detail. For example, given the outline of a featureless cube and a texture map defining a wood grain pattern, texture mapping techniques can be used to "map" the wood grain pattern onto the cube. The resulting display is that of a cube that appears to be made of wood. In another example, vegetation and trees can be added by texture mapping onto an otherwise barren terrain model. Likewise, labels can be applied onto packages or cans for visually conveying the appearance of an actual product. Textures mapped onto geometric surfaces provide motion and spatial cues that surface shading alone might not provide. For example, a sphere rotating about its center appears static until an irregular texture or pattern is affixed to its surface.

The resolution of a texture varies, depending on the viewpoint of the observer. For example, the texture of a block of wood displayed up-close has a different appearance than if that same block of wood were to be displayed far away. Consequently, there needs to be some method for varying the resolution of the texture. One available approach is to compute the variances of texture in real time, but this is usually too slow for complex textures or requires expensive hardware to implement.

A more practical approach creates and stores a MIP-map (Multum In Parvo meaning "many things in a small place"). The MIP-map comprises a texture pattern pre-filtered at progressively lower or coarser resolutions and stored at varying levels of detail (LOD) in the form of maps. See, e.g., the explanation of conventional texture MIP-mapping in Foley et al., Computer Graphics Principles and Practice, Second Edition, Addison-Wesley Publishing Company, Reading, Mass. (1992), pages 741–44 and 826–828 (incorporated herein by reference).

FIG. 1A shows a conventional set of texture LOD maps having pre-filtered texel data associated with a particular texture. Four different levels of detail (LOD[O]-LOD[3]) are shown. Each successively coarser texture LOD has a resolution half that of the preceding LOD in each dimension until a unitary LOD is reached representing an average of the entire high resolution base texture map. Thus, in FIG. 1A, LOD[0] is a high resolution 8×8 texel array; LOD[1] is a 4×4 texel array; LOD[2] is a 2×2 texel array; and LOD [3] is a single 1×1 texel array. Of course, in practice each LOD can contain many more texels, for instance, LOD[0] can be 8k×8k, LOD[1] 4k×4k, and so forth depending upon the particular hardware or processing limits encountered.

The benefit of MIP-mapping is that variance calculation, or filtering, is only performed once on texel data when the MIP-map is initially created and stored in a plurality of LOD maps. Thereafter, texels commensurate with pixel size are obtained by selecting the closest LOD map having an appropriate resolution. By obtaining texels from the pre-filtered LOD maps, filtering does not have to be performed during run-time, and more sophisticated filtering operations can be executed during preliminary modeling without delaying real-time operation speed.

To render a display at the appropriate image resolution, a texture LOD is selected based on the relationship between the smallest texel dimension and the display pixel size. For a perspective view of a landscape 100, as shown in FIG. 1B, the displayed polygonal image is "magnified" in a foreground region relative to polygonal regions located closer to the center horizon and background along the direction indicated by the arrow. To provide texture for pixels in the closest foreground region, texels are retrieved from the finest resolution map LOD[0]. Appropriate coarser LODs are used for texel data covering pixels located further away from the viewer's eyepoint. Such multi-resolution texture MIP-mapping ensures that texels of the appropriate texture LOD get selected during pixel sampling. To avoid discontinuities between images at varying resolutions, well-known techniques such as linear interpolation are used to blend the texel values of two LODs nearest a particular pixel's resolution.

A significant drawback of conventional MIP-mapping, however, is the speed with which the data stored in the maps can be retrieved. For example, main memory in the form of a dynamic random access memory (DRAM) or a static random access memory (SRAM) is an expensive, somewhat slow, and inefficient site for a large texture MIP-map. The problem is exacerbated by the fact that each higher level of detail map requires four times more memory than the next smaller map. For example, a 16×16 texture array having 256 texture picture elements (texels), is four times bigger than an 8×8 texture array which has 64 texels. To put this increase in perspective, a texture MIP-map having six levels of detail requires over 4,096 times more memory than the texture map at the coarsest resolution found in the MIP-map. Implementing and accessing large texture MIP-maps quickly becomes an expensive and challenging luxury. In addition, for large texture MIP-maps, many portions of the stored MIP-map are not used in a display image, resulting in wasted space and unnecessarily slowed access time.

Thus, there is a need to efficiently access large texture data maps for display purposes so as to minimize attendant data retrieval delay and costs. Final images in an improved texture data accessing system are preferably indistinguishable from or an improvement upon those accessed using a traditional approach.

One approach found in industry is the use of a high speed cache dedicated to the storage of texture data. However, available caching techniques are less than satisfactory for an industry focussed on keeping data access and processing speed to a maximum and cost to a minimum. For example, an available "most recent four" texel cache stores the last four texels requested in an easily accessed format, but for only one pixel over a plurality of clock cycles. Larger texel caches that service a plurality of texels for each pixel in each clock cycle may also be combined to form a cache array. However, such brute force approaches can be quite expensive to implement in silicon. Similarly, the use of multiple, independent memories, each storing aligned texels, is only effective when all active textures are stored in cache, again aggravating cost and silicon real estate concerns.

There is therefore a need in the art of texture data manipulation for a wide bandwidth caching scheme that accommodates increasing graphics processing system speeds without monopolizing considerably more silicon real estate than is currently dedicated to the texture data storage and access tasks.

SUMMARY OF THE INVENTION

To address the shortcomings of the available art, the present invention provides a texture data caching apparatus and method including an efficient tagging scheme, wherein texels are efficiently assembled for processing within grouped cache entries.

The invention therefore provides a method of encoding texel storage addressing information in a graphics rendering system for processing pixels and texels, each pixel in the system having a plurality of associated texels, the method comprising selecting a pixel, determining the plurality of texels associated with the selected pixel, addressing fewer than the total number of the plurality of associated texels, storing the plurality of associated texels in a storage, deriving the addresses of the remaining texels from at least one of the addressed texels, accessing from the storage the plurality of associated texels.

The invention further provides a computer graphics texture data storage system for providing texture data to a graphics rendering system, the data storage system comprising a texture data storage unit for storing a first plurality of texture data entries, the unit being in electrical communication with a texture data request source, aggregating means for aggregating a plurality of texture data requests received from the source, thereby creating an aggregated request, retrieving means for simultaneously retrieving a second plurality of texture data entries from the storage unit in response to the aggregated request, the second plurality comprising a subset of the first plurality.

The invention further provides a computer graphics texel storage system for providing texels in response to texel requests, the data storage system comprising a texel storage unit, the storage unit storing a plurality of texels, a texel request aggregation unit in electrical communication with the storage unit, the aggregation unit aggregating a plurality of texel requests, and a retrieving unit in electrical communication with the request aggregation unit, the retrieving unit simultaneously retrieving a plurality of texels from the storage unit in response to an aggregated request received from the aggregation unit.

The invention also provides a method of retrieving texture data entries from a texture data storage unit for a graphics rendering system, the method comprising the steps of receiving a plurality of texture data entry requests, aggregating the plurality of requests to create an aggregated request, and simultaneously retrieving a plurality of texture data entries in response to the aggregated request.

The invention further provides a computer graphics texture data storage system for providing texture data to a graphics rendering system, the storage system comprising a first texture data cache having a first data access structure, the first data access structure being independent of a method for accessing data stored within the first cache, a second texture data cache having a second data access structure, the second data access structure being linked to a method for accessing data stored within the second cache.

The invention still farther provides a computer graphics texture data storage system for providing data to a graphics rendering system, the storage system comprising a format conversion unit for converting received graphics data from one graphics format to another, less storage-efficient format, a data storage unit, wherein the format conversion unit forwards data to the data storage unit.

BRIEF DESCRIPTION OF THE DRAWINGS

The aforementioned advantages of the present invention as well as additional advantages thereof will be more clearly understood hereinafter as a result of a detailed description of a preferred embodiment of the invention when taken in conjunction with the following drawings.

DETAILED DESCRIPTION OF A PREFERRED EMBODIMENT

Figure 1A:
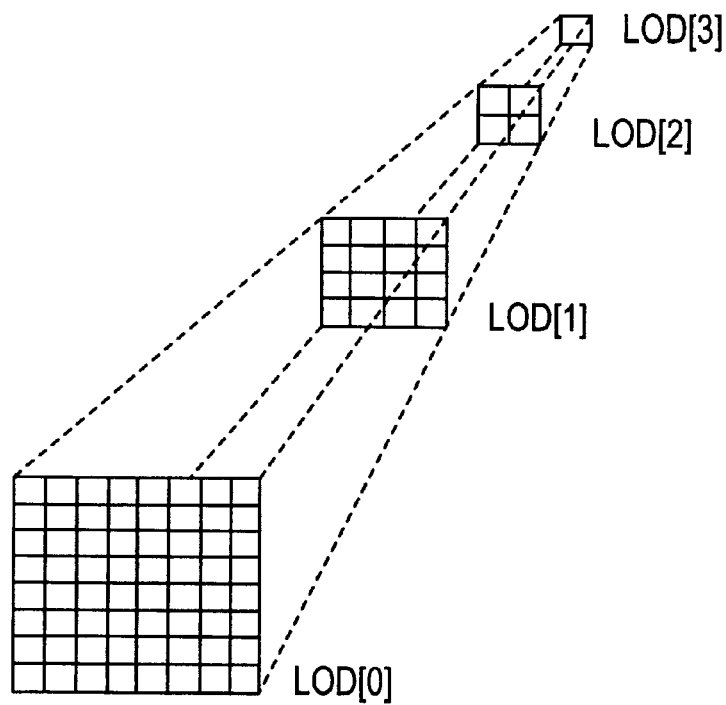
FIG. 1A shows a conventional multi-resolution MIP-map covering four levels of detail.
Figure 1B:
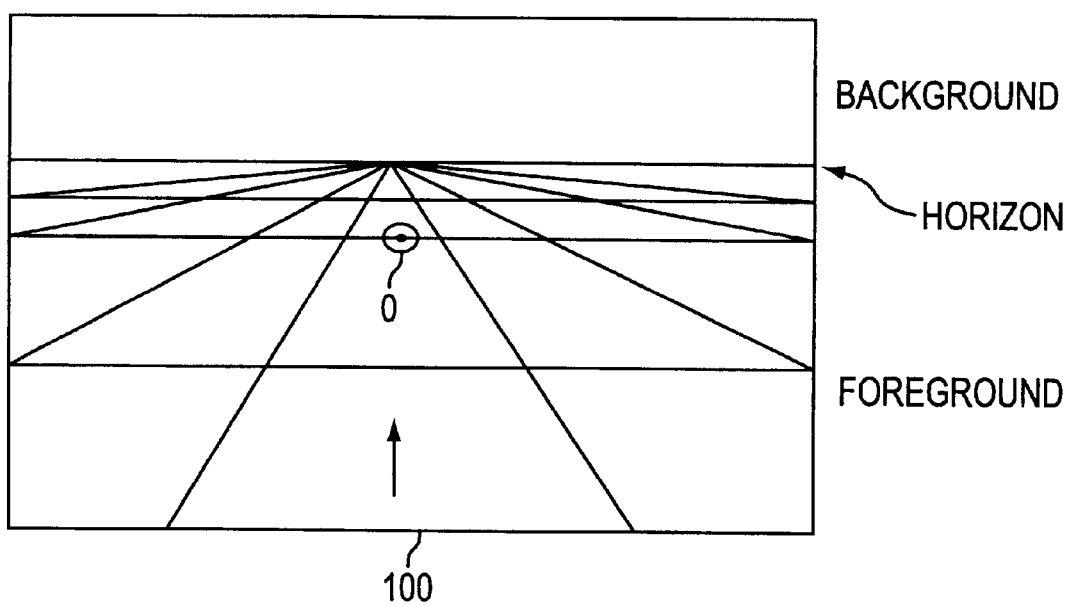
FIG. 1B shows a conventional example of a polygon perspective of a landscape to which texture MIP-mapping can be applied.
Figure 2:
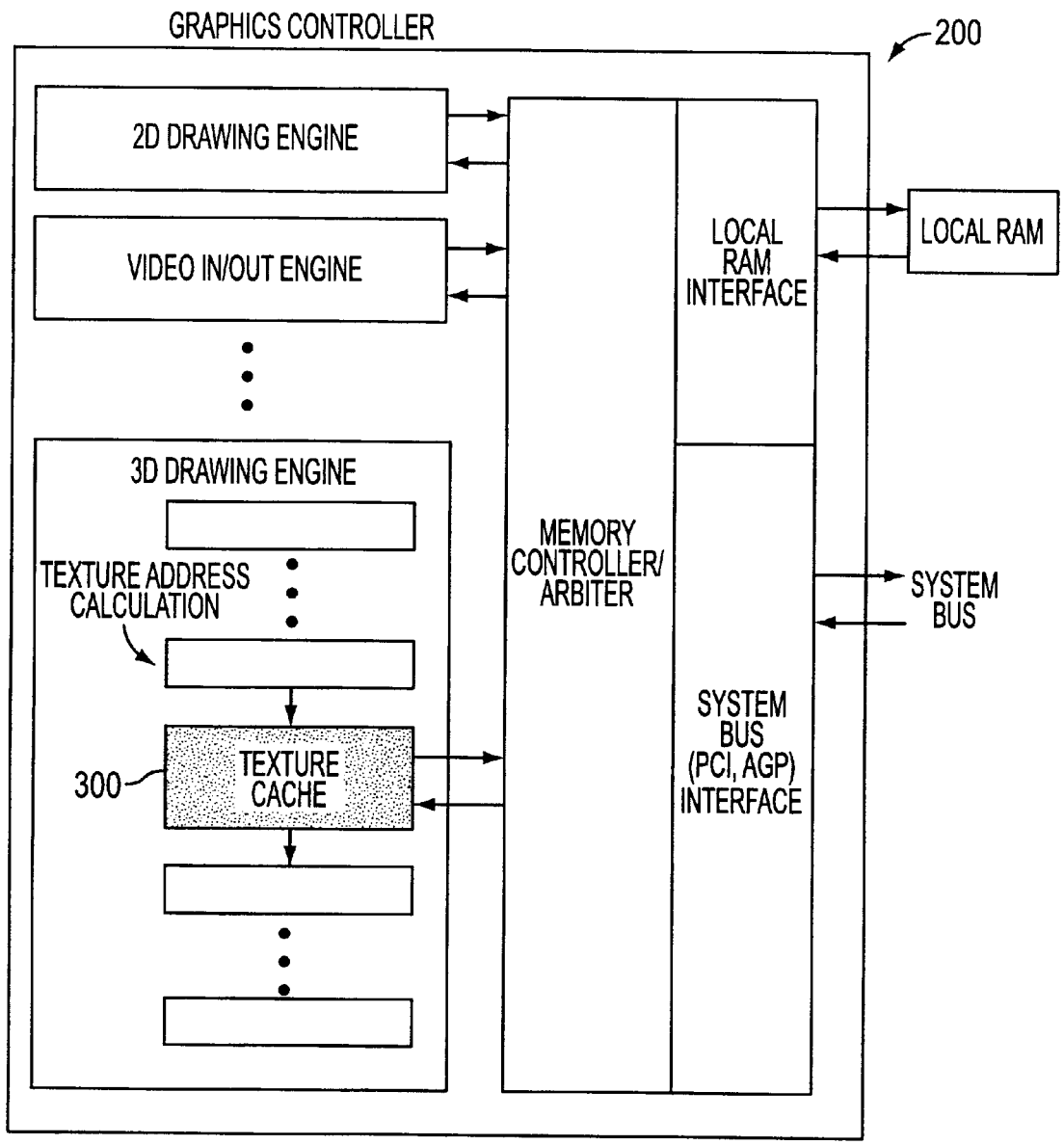
FIG. 2 illustrates a hardware environment in which the method and apparatus of the present invention may be implemented.

Referring now to FIG. 2, a preferred hardware environment for practicing the method and system of the present invention is illustrated. Texture cache 300 is preferably implemented within an integrated circuit device 200 comprising circuitry for graphics control and data processing tasks. While a preferred embodiment is implemented within an application specific integrated circuit (ASIC), alternative embodiments could be implemented within a programmable device such as an FPGA or programmable ASIC.

Figure 3:
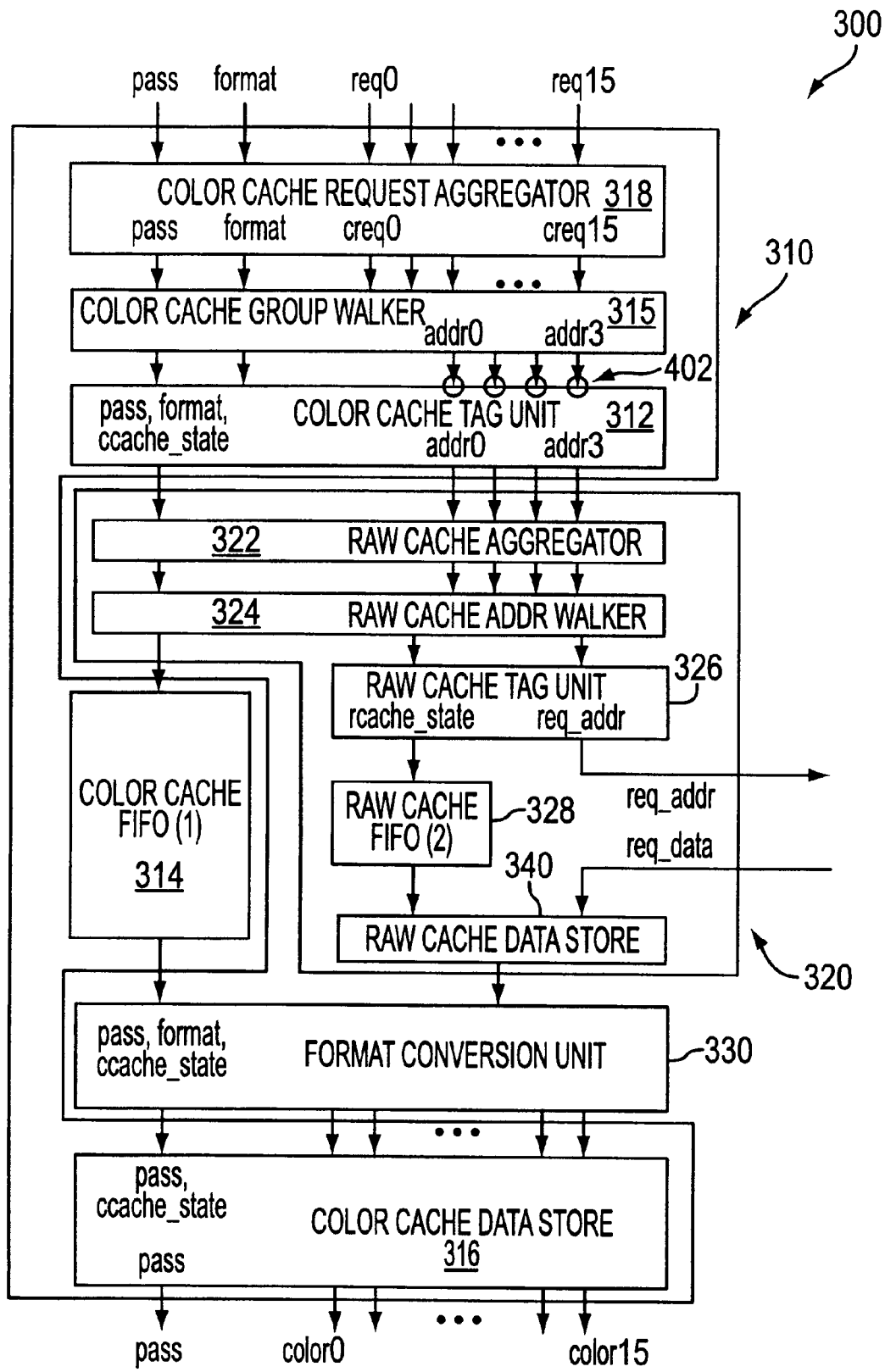
FIG. 3 illustrates the multi-level texture data cache of the present invention.

Referring next to FIG. 3, the preferred texture cache 300 of the present invention comprises two primary stages, a color cache 310 and a raw cache 320, and a format conversion unit 330. Color cache 310 preferably stores 16 texel colors per cache entry in a 32 bit per texel format, although any number of alternative formats may be accommodated. Raw cache 320 stores 256-bit words from 256-bit memory reads.

Figure 4:
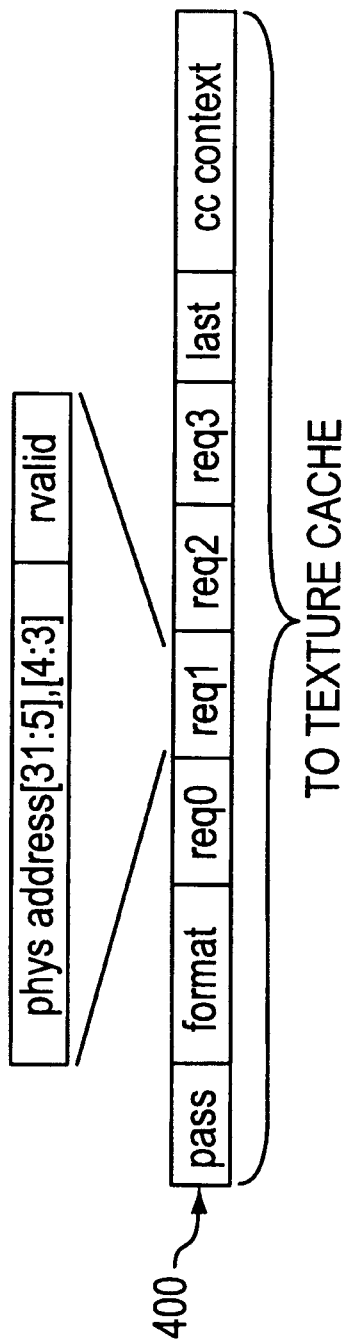
FIG. 4 illustrates the preferred input data format of the cache illustrated in FIG. 3.

Color cache 310 comprises color cache tag unit 312, color cache FIFO 314, color cache data store 316, color cache request aggregator 318, and color cache group walker 315. Color cache tag unit 312 receives up to four addresses from a plurality of address ports 402, the data format of which is illustrated in FIG. 4. Raw cache 320 satisfies each of the requests received by color cache tag unit 312 that cannot be immediately satisfied by color cache 310. Thus, raw cache 320 works as a backup cache to primary color cache 310. Color cache aggregator 318 maps individual texel requests to specific cache footprints. Color cache group walker 315 sequentially requests the aggregator's requested footprints. The function of both elements 315 and 318 is consistent with that of corresponding raw cache elements 324 and 322, respectively, as explained below.

Each of the four address request ports 402 near color cache tag unit 312 can preferably satisfy up to 16 texel requests per clock cycle, as explained below. Upon receipt of the texel requests from color cache tag unit 312, raw cache 320 attempts to group them into one or more unique, 256-bit, raw cache entries. Raw cache 320 then posts from zero to four memory requests when zero to four of its incoming requests, respectively, are not immediately available, an event referred to herein as a "miss". Raw cache 320 therefore takes one clock cycle to accept each request. Thus, three unique requests will be executed within three cycles, even if they all result in found data, referred to herein as "hits". If all three requests are hits, no responsive memory requests will be needed. But where there are responsive requests, raw cache 320 then takes one additional cycle to generate and forward each valid request to color cache 310.

Figure 5:
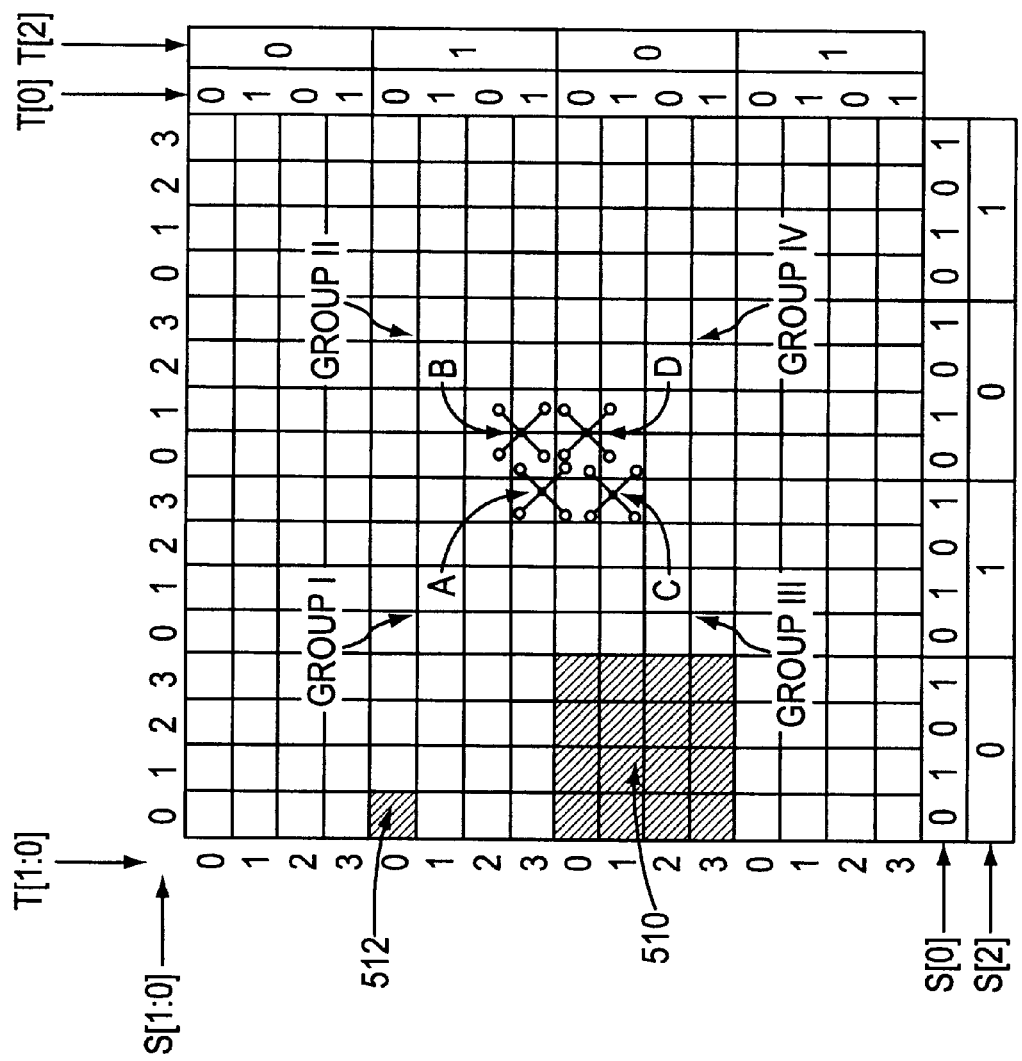
FIG. 5 illustrates the cache footprint of the present invention.
Figures 6, 15:
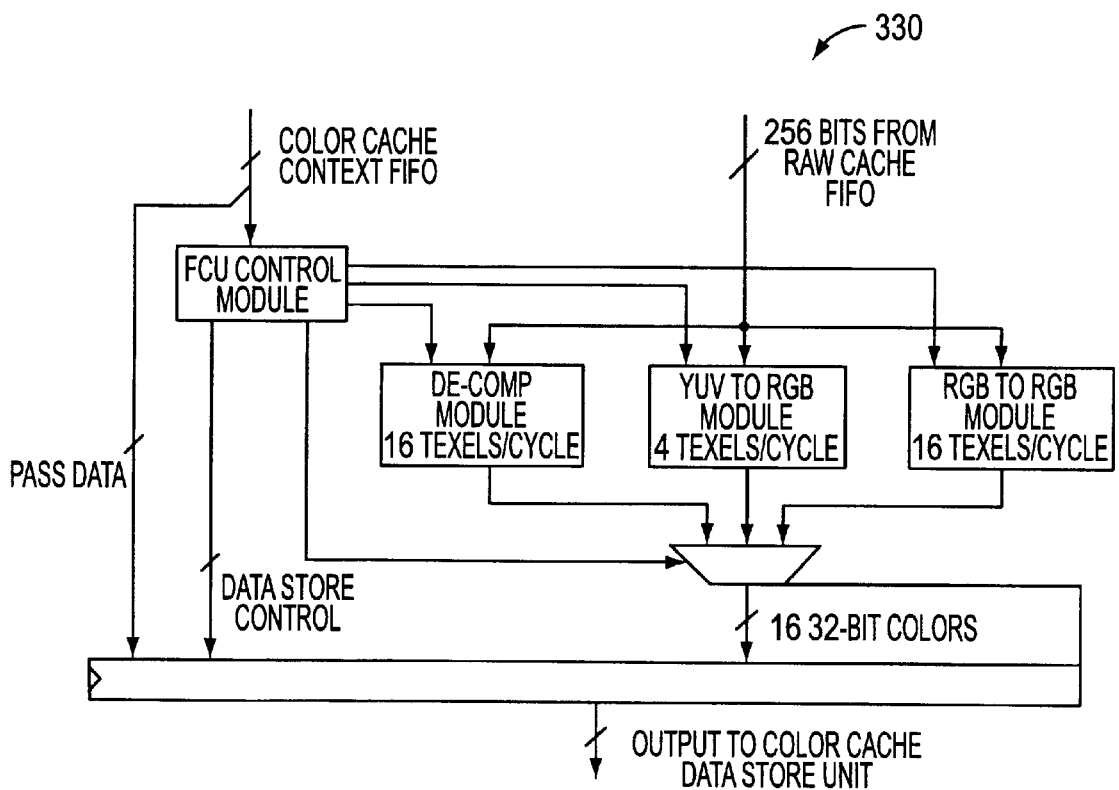
FIG. 6 illustrates an exemplary tiled, 4-bit texture data format used to illustrate the method and structure of the present invention.
FIG. 15 provides a detailed block diagram of the format conversion unit illustrated in FIG. 3.

Turning next to FIG. 5, a preferred method of texel storage is illustrated within texture address ("ST") space. FIG. 5 illustrates the provision of unique cache request footprint, providing special advantage to the texture cache of the present invention. For the purpose of this illustration, and to simplify the illustrations, a 4-bit per texel texture granularity is assumed, as illustrated in FIG. 6. However, much higher texel granularity may be accommodated within the method and system of the present invention. For example, 8-, 16-, and 32-bit textures are all envisioned in both a tiled data format, as illustrated in FIG. 6, and a linear format.

Figure 7:
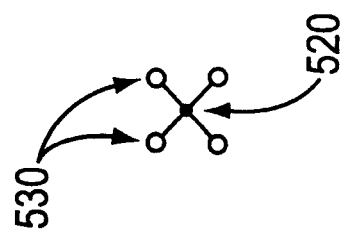
FIG. 7 illustrates a bilinear pixel sampling quad stored within the cache footprint scheme illustrated in FIG. 5.

FIG. 5 illustrates a 4×4 array of color cache footprints 510, which, when occupied, are referred to herein as cache-entries. Each footprint accommodates a 4×4 array of texels 512. For illustration purposes, four pixels are shown, labeled A through D, each having a unique texel address pair in ST space. Referring to FIG. 7, wherein a bilinear sample arrangement of a point in texel space is illustrated, each pixel sample point 520 within ST space is split out to four texel points 530. Thus, returning to FIG. 5, pixel A includes one texel within each of the four cache-entries I through IV. All of pixel B's texels are within cache-entry II. Two of pixel C's texels are within cache-entry III, while two are within cache-entry IV. Finally, all of pixel D's texels are within cache-entry IV. Put another way, cache-entry I satisfies one texel cache request, cache-entry II satisfies five cache requests, cache-entry III satisfies three requests, and cache-entry IV satisfies seven requests. Together, the four cache-entries I through IV satisfy all 16 requests for texels from cache 300. Since all 16 sample points are found within only four unique entries, all 16 texel requests are satisfied by only four cache tag queries, and tremendous cache tag bandwidth savings is achieved.

The bandwidth savings illustrated in FIG. 5 can be generalized. In the MIP-mapped environment of the present invention, and where $0.5 \leq \Delta S < 1$ and $0.5 \leq \Delta T < 1$, not more than four unique cache-entries are needed to satisfy as many as 16 requests. Thus, the probability of missing more than four requests is zero in an environment using the cache-entry grouping scheme of the present invention.

Cache 300 is preferably optimized to handle the most common MIP-mapped textures without the application of an extreme LOD bias, thereby reducing computational intensity and increasing operational efficiency and performance. In a preferred embodiment, cache 300 is optimized to handle four queries per cycle. However, it should be noted that it is mathematically possible that highly minimized, highly LOD-biased, linear, and non-MIP-mapped textures can produce more than four misses, resulting in some performance degradation.

Linear mode operation present an exception to the working assumption of a texture space footprint of four or fewer cache-entries. All linear mode textures require more entries to achieve the same texel space footprint height as tiled mode textures.

The data fields directly entering color cache tag unit 312 are illustrated in block 400 of FIG. 4. There are four address requests, each including a physical address and S and T bits to select a cache footprint for storage, where more than one are available from which to choose. A request valid (rvalid) sub-field is included to mark each of the four physical address requests.

Figure 8:
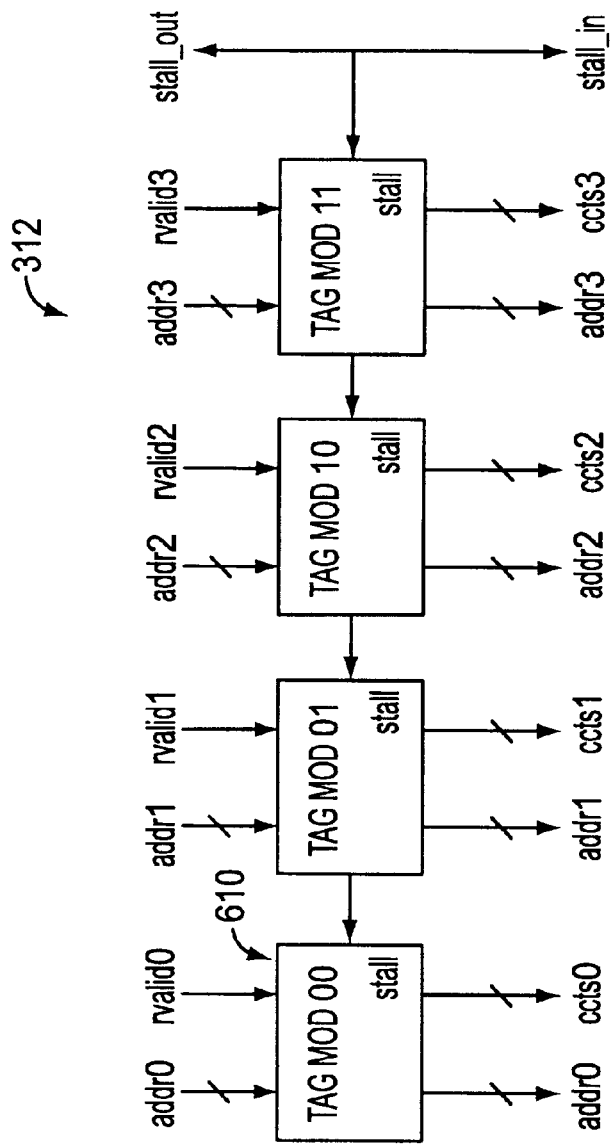
FIG. 8 provides a detailed block diagram of the color cache tag unit illustrated in FIG. 3.

Color cache tag unit 312 receives four address requests per clock cycle and produces four address requests to raw cache 320 per clock cycle. FIG. 8 provides a detailed illustration of color cache tag unit 312. Unit 312 comprises four independently operating tag modules 610. Address and validity signals from the physical ports enter each of the four tag modules 610.

Figure 9:
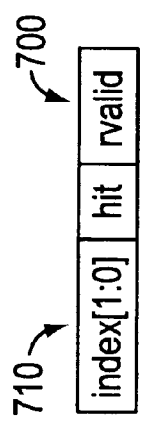
FIG. 9 illustrates the preferred input data format of the cache tag unit of FIG. 8.

The data exiting each tag module 610 is an address and a color cache tag status ("CCTS") signal. The data fields within each CCTS signal are illustrated within signal block 700 in FIG. 9. Index 710, together with the tag unit number, indicates which address is to be read or written in color cache data store unit 316. The bits then written to data store unit 316 on a miss (when signal hit is 0 and rvalid is 1) define which addresses are to be written. When reading (hit is 1 and rvalid is 1), additional S and T bits are needed to extract the specific pixel, and the necessary bits are extracted from the lower S and T bits.

Figure 10:
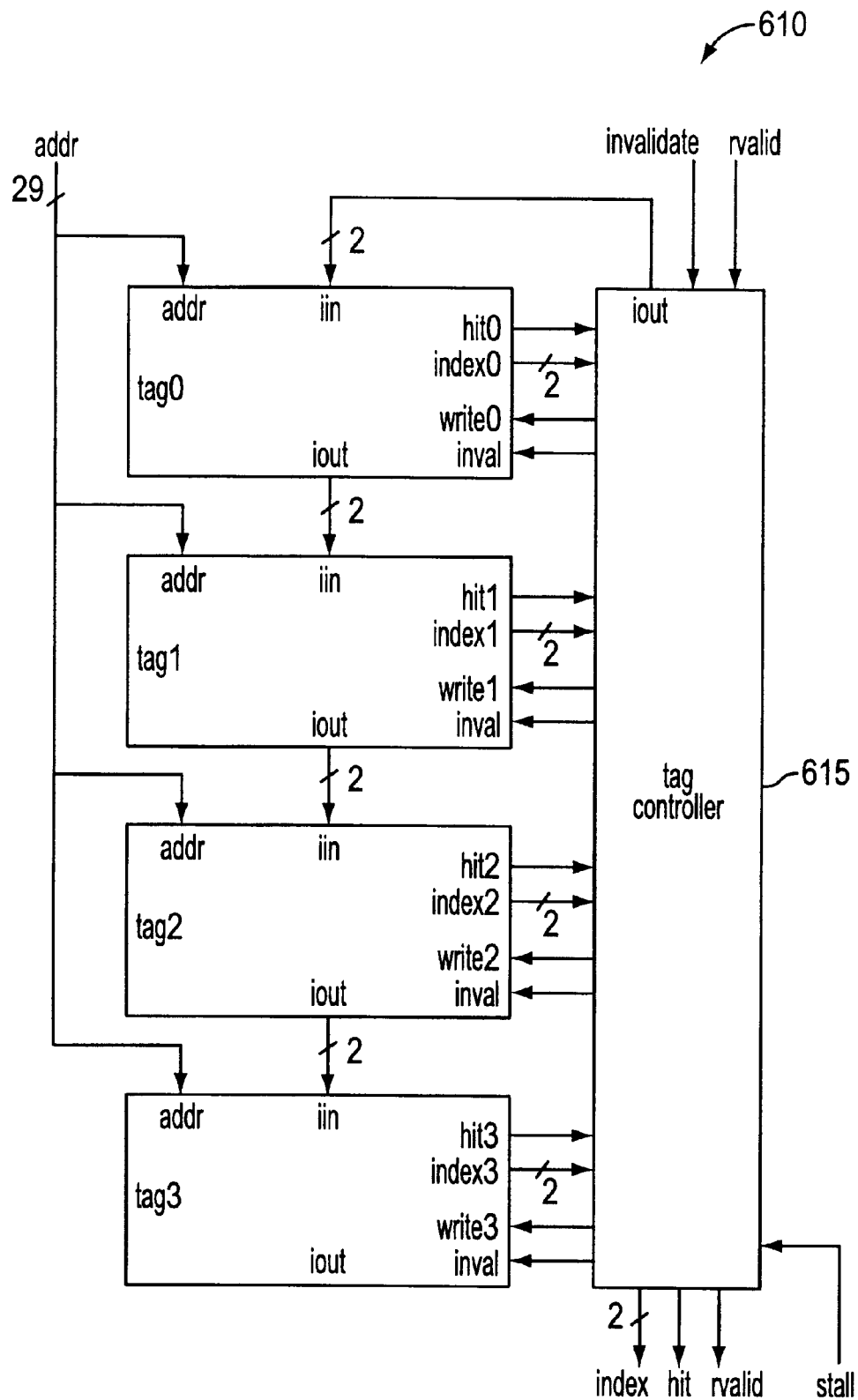
FIG. 10 illustrates a tag module within the cache tag unit of FIG. 8.

Referring next to FIG. 10, each tag module 610 comprises four tag entry modules tag0 to tag3 and one tag control module 615. Each tag entry includes an address tag and an index number from 0 to 3. Upon reset, tag0 resets its index to 0, tag1 resets its index to 1, and so on. Each tag entry also resets to a "not valid" state. Mapping from an address tag to an entry in cache 300 is therefore made through the illustrated index signal. A Least Recently Used ("LRU") mapping policy is preferably implemented by shifting the tag and index towards the bottom of the list until the tag is replaced with new data at the top of the list. When an entry hits, the tag is collapsed in the list and re-inserted at the top of the list. Tag controller 615 coordinates the four tag entry modules. It should be noted that a Least Recently Allocated ("LRA") policy may be implemented in the alternative, but LRU is preferred.

The behavior of each tag entry module can be divided into compare and replace functions. The compare function comprises reporting a hit to controller 615 if the input address (addr[31:3]) matches the tag value and the tag state is "valid". When tag controller 615 asserts a write signal back to a tag entry module, the locally stored compare tag is overwritten (i.e., replaced) with the address input. Thus, the locally stored index value is overwritten with Iin and the state of that entry is set to "valid". If the inval signal is asserted, then the entry state is set to "not valid". All four tags are invalidated on the same cycle if "inval" is asserted and signal "stall" is de-asserted.

Tag controller 615 generates four sets of two signals that go to each of the cache entries. The inval signal is asserted when stall is de-asserted and invalidate is asserted, thereby clearing the tag state. Write signals therefore depend on the collection of hit signals, stall, and rvalid. If rvalid is de-asserted then no update action takes place. If stall is asserted, the entire tag unit 312 stalls.

If a hit occurs, then all the writes, starting with the hitting tag, are asserted, causing the tag that is hit to be collapsed in the list and reinserted at the top. If no tag hits, then all writes are asserted, causing the oldest entry to be de-allocated and a new entry to be inserted at the top. Tag controller module 615 therefore generates an index (tag controller signal Iout) to insert at the top entry, along with the new address inserted at the top of the list by selecting the hit index when a hit occurs or the bottom index when a miss occurs. After a few cycles of operation, the index order looking down the list can become arbitrarily mixed, but tag-to-data store mapping is simple and explicit, providing an efficiently implemented LRU replacement scheme.

Signal Iout (the index output) functions as the hit index when a hit occurs and the newly allocated index when a miss occurs. The hit output is asserted on a hit. The rvalid output signal is asserted one cycle after an rvalid input is received, along with flopped hit and index signals.

Figure 11:
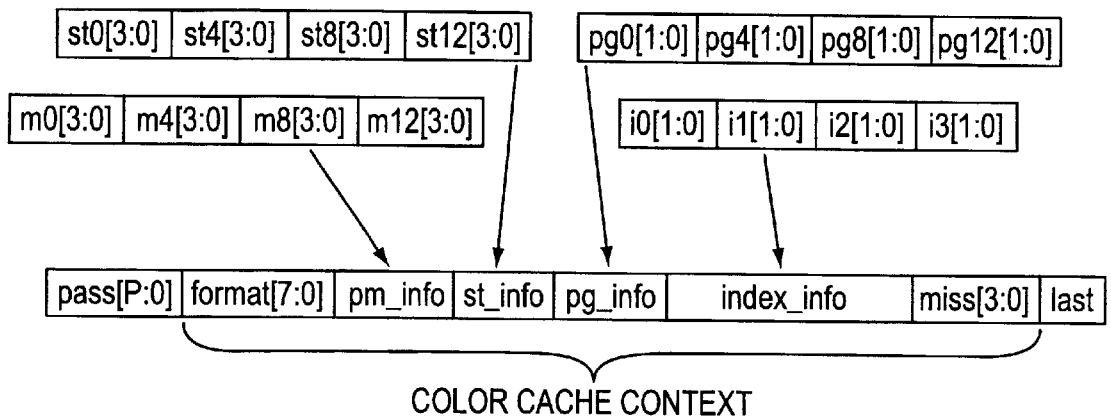
FIG. 11 illustrates the preferred input data format of the color cache FIFO illustrated in FIG. 3.
Figure 14:
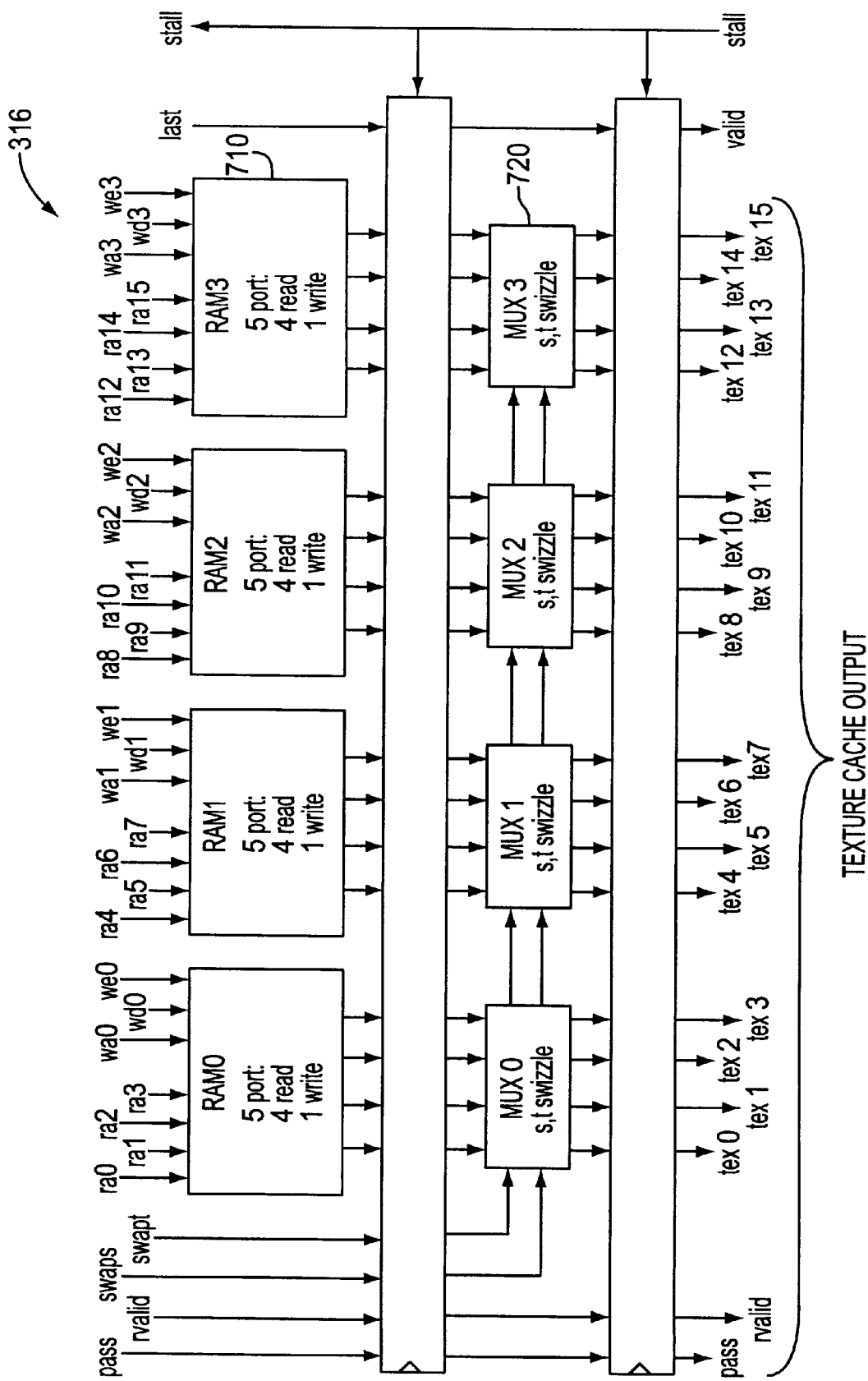
FIG. 14 provides a detailed block diagram of the color cache data store illustrated in FIG. 3.

Turning next to color cache FIFO 314 within texture cache 300 of FIG. 3, this FIFO compensates and accounts for the uncertainty in memory request latency when conveying information from color cache tag unit 312 to color cache data store 316. The data fields pushed into FIFO 314 are illustrated in FIG. 14. Each unique color cache entry touched by a given texture cache request results in a push to FIFO 314 of the data illustrated in FIG. 11. Color cache context data occupies 63 bits in the FIFO, while pass data occupies another P+1 pass bits to accommodate per-pixel, non-cache data.

The upper three bits (7:5) of the format field specify access modes. Bit 7 indicates whether the access is to local RAM or AGP ("Accelerated Graphics Port") space. Bit 6 indicates whether the access is to tiled or linear space. If the access is to a tiled space, then bit 5 is needed to specify which of two tile modes is being used.

The pixel mask information field (pm_info)denotes which texel requests have been filled. The first mask (bits 0 to 3) corresponds to request ports 0 to 3. These, in turn, correspond to the upper left (0), upper right (1), lower left (2), and lower right (3) texel positions for pixel 0 (upper left on screen). Pixel 1 (upper right on screen) is represented in m4, pixel 2 (lower left on screen) is represented in m8, and so on. When all requests are color cache hits, the combination of these four masks is the original rvalid input vector, presented at the cache output as described below. When from one to four misses occur, the masks indicate which texels are filled after the miss or misses are satisfied. If more than four misses occur and the color cache has to spend more than one cycle satisfying a request, then the mask indicates the texels satisfied by the current cycle's data.

Fields st0 through st12 contain the coordinates of each pixel's top left texel in ST space within a referenced cache-entry. The top left texel serves as the reference from which the other three texel coordinates are derived, instead of explicitly encoding the coordinates of every texel. Values m0 through m12 indicate which of 16 texels from a cache entry satisfy the reference texel. The other texels are always at an offset of +1 in S and +1 in T relative to the reference texel. The pg0 through pg12 fields indicate which of the four color cache tag groups each of the four reference texels is in. The i0 through i3 fields indicate which tag groups from the four entries are participating in this cycle. For example, a value of 3 in the pg0 field indicates that the reference texel for pixel 0 (st0) is in the cache entry indicated by i3.

Fields i0 through i3 map directly to tag modules 610 in color cache tag unit 312. Each value is the hit/miss index from each of the four modules. The miss[3:0] field indicates which of the index_info field index values are misses. In a miss condition, the current cache entry to write is given by the lowest set miss field flag and the value in the appropriate field i0 to i3. For example, if miss [3:0] is 0110, then a cache entry associated with tag group i1 is to be written first, and tag group i2 next. The first cache entry to be filled is selected by the value in i1 [1:0], while the second to be filled is in i2[1:0]. The "last" field is a single bit indicating that the 16 original input requests (and, alternatively, a cache write as well) have been completely serviced.

Extracting three texel ST values from the reference value involves examining the S and T value of the reference texel (st0, st4, st8, or st12) and incrementing that value by one in the S dimension and by one in the T dimension. Incrementing in either dimension may exceed the footprint of the reference texel's cache entry, so some additional information is required to determine both the target cache entry and the ST coordinates in that target cache entry.

Figure 12:
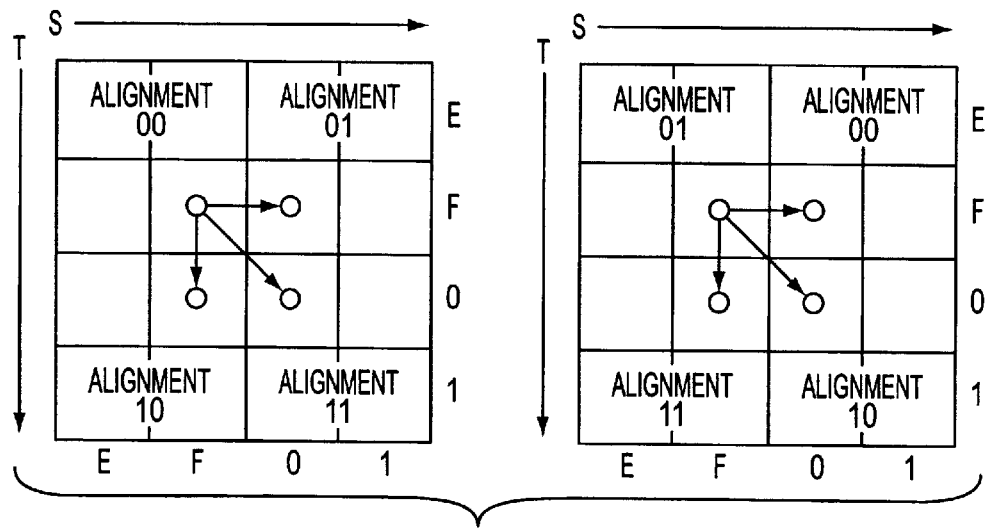
FIG. 12 illustrates the preferred method of deriving position information in S and T space using the method and system of the present invention.

Referring to FIG. 12, the ST calculation process for crossing cache-entry boundaries is illustrated. Orientation of cache-entries is derived from pg0 through pg12. If the groups are oriented with respect to S as shown on the left, then alignment is even; if they are reversed, as shown on the right, then alignment is odd. From a reference texel (top left) we can now calculate the other three texel's entry and ST coordinates. The alignment is similarly reversible in the T dimension.

Figure 13:
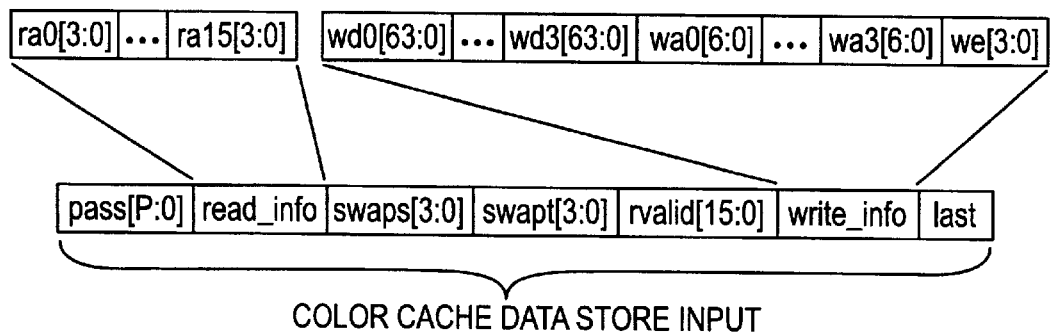
FIG. 13 illustrates the preferred input data format of the color cache data store illustrated in FIG. 3.

Referring again to FIG. 3, color cache data store 316 accepts write data from the format conversion unit at a rate of 4, 8, or (preferably) 16 texels per cycle, and accepts read addresses as shown in the data fields of FIG. 13. Field read_info comprises 16 read addresses used by the 16 total read ports (four ports in each of four RAMs within the color cache data store 316 illustrated in FIG. 14). Fields swaps and swapt align read data to the appropriate output color port, as explained below. Field rvalid indicates which of the sixteen output colors are the result of valid read requests. The write_info field comprises four 64 bit data words, four 7-bit address, and four write enable bits. The "last" bit indicates that all the cache requests are filled and the 16 resulting data items are ready to be passed down the pipeline. A bypass path in the RAMs provides optimal performance, enabling data written to a given address to be read from that address within the same cycle.

Color data is preferably sorted by S and T least significant bit (LSB) alignment. The four RAMs 710, each having one write port and four read ports, are used to store four sets of 16 colors each. Each 16-texel color cache entry therefore stores four colors in each of the four RAMs. Four colors can be written at a time, and four can be read at a time, providing a total read rate of 16 colors out of, and a write rate of 16 colors into, data store RAM 710.

Multiplexers 720 assist in mapping each request to the appropriate S and T aligned RAM. Each mux 720 receives one color from each of the four RAMs. In tiled mode, the colors form a 2×2 block. If the 2×2 block is aligned with the four target texels, then no swapping is necessary. If the texels from each of the four pixels (0–3, 4–7, 8–11, and 12–15) are miss-aligned, then they are swapped in S or T space. The swaps and swapt signals provide indication of which mux 720 needs to swap in S or in T. For example, if the reference texel for pixel 0 lands on an even S value, then either RAM0 or RAM2 will contain the required data for that texel, depending upon the T alignment. While, in this case, no swapping is necessary, if the reference texel lands on an odd S value, then either RAM 1 or RAM 3 will contain the required data for that texel, in which case swaps[0] is 1 and the data for RAMs 0 and 2 is swapped with the data for RAMs 1 and 3, respectively. A second swap can then occur for T-dimensional alignment. Linear mode data can also be accommodated by staggering the texel storage locations, in a manner understood by one skilled in the art to which the present invention pertains.

Returning again to FIG. 3, raw cache 320 accepts four requests per cycle. Raw cache aggregator 322 groups addresses, while raw cache walker 324 presents unique addresses to raw cache tag unit 326. Thus, from one to four clock cycles are needed to process a request to raw cache 320. Raw cache data store 340 requires one cycle per valid address request to present outgoing data to format conversion unit 330, even if all four cycles are spent emitting the same address contents or hit data. In this manner, all valid requests presented to raw cache 320 are retired, and raw cache 320 outputs data at the peak absorption rate of a preferred format conversion unit 330, illustrated in FIG. 15, and color cache data store 316.

Raw cache request aggregator 322 addresses the need to efficiently handle a plurality of unique tag groups found within the same 256-bit memory address (in 4-bit and 8-bit per texel modes). When this happens, only the unique addresses are posted to raw cache tag unit 326. Thus, four requests can be collapsed down to as few as one actual tag query and perhaps as few as zero memory requests if there is a raw cache hit. Raw cache context FIFO 328 (rcFIFO) gets one push per raw cache tag query. If all four addresses can be aggregated into one request, then only one FIFO push is necessary. Each FIFO push is marked with the number of raw cache requests it represents.

Raw cache address walker unit 324 accepts a stall signal from raw cache tag unit 326. This stall is actually the ORed output of all stall signals forwarded from rcFIFO 328. Walker 324 generates stalls when the number of unique addresses is greater than one. Up to three stalls can therefore be generated to accommodate up to four total cycles.

Raw cache walker 324 scans the four request inputs from aggregator 322 and serializes them down to one per cycle, which is then presented to raw cache tag unit 326. Starting with the first memory request cycle for a group of up to four requests, walker 324 pushes the grouping information provided by aggregator 322 to rcFIFO 328. This grouping information is then used by data store 340 when presenting the memory reads to format conversion unit 330.

Raw cache tag unit 326 receives a sequential stream of address requests and generates memory requests when those address requests miss. The unit accepts and propagates a stall signal, but does not generate stalls of its own. Tag lookups and writes are preferably always completed within the same cycle. A preferred raw cache tag unit structure is a single 16-entry version of color cache tag module 312 described above.

Raw cache data store 340 contains entries for 256-bit words in a 256-bit×N RAM. Raw cache data store 340 slaves its state from raw cache address walker 324 and tag unit 326. When tag unit 326 detects a hit, data store 340 is instructed to read the address associated with that hit from its RAM and present the address as output. When a miss occurs, data store 340 overwrites the indicated address in its RAM and presents that data as output, preferably in the same cycle.

The present invention therefore provides a novel caching scheme for quickly accessing texture data in a graphics data processor. Although the present invention has been shown and described with respect to preferred embodiments, various changes and modifications lie within the spirit and scope of the claimed invention. The corresponding structures, materials, acts, and equivalents of all means or step plus function elements in the claims are intended to include any structure, material, or acts for performing the functions in combination with other elements as specifically claimed.

What is claimed is:

1. A computer graphics texture data storage system for providing texture data to a graphics rendering system, the data storage system comprising:

a texture data storage unit for storing a first plurality of texture data entries, the unit being in electrical communication with a texture data request source, wherein the texture data storage unit comprises a plurality of texture data storage footprints;

means for aggregating a plurality of texture data requests received from the source, thereby creating an aggregated request;

means for simultaneously retrieving a second plurality of texture data entries from the storage unit in response to the aggregated request, the second plurality comprising a subset of the first plurality, wherein the means for simultaneously retrieving comprises means for tagging stored texture data likely to be requested.

2. The data storage system of claim 1, wherein the second plurality of texture data entries are substantially adjacent.

3. The data storage system of claim 2, wherein the substantially adjacent texture data entries are stored in a texture data storage footprint.

4. The data storage system of claim 1, wherein each of a plurality of texture data requests from the source corresponds to a unique address, the means for aggregating comprising means for analyzing each unique address, and, if at least two requests are sufficiently adjacent, aggregating the sufficiently adjacent at least two requests.

5. The data storage system of claim 1, wherein each of the texture data storage footprints comprises a plurality of texture data storage slots.

6. A computer graphics texel storage system for providing texels in response to texel requests, the data storage system comprising:

a texel storage unit, the storage unit storing a plurality of texels, wherein the texel storage unit comprises a plurality of texture data storage footprints;

a texel request aggregation unit in electrical communication with the storage unit, the aggregation unit aggregating a plurality of texel requests;

a retrieving unit in electrical communication with the request aggregation unit, the retrieving unit simultaneously retrieving a plurality of texels from the storage unit in response to an aggregated request received from the aggregation unit, wherein the retrieving unit comprises means for tagging stored texture data likely to be requested.

7. The system of claim 6, wherein the simultaneously retrieved plurality of texels are adjacently stored within the storage unit.

8. The system of claim 7, wherein the adjacently stored texels are stored within a texel storage footprint.

9. The system of claim 6, wherein each of a plurality of texel requests corresponds to a unique address, the means for aggregating comprising means for analyzing each unique address, and, if at least two requests are sufficiently adjacent, aggregating the sufficiently adjacent at least two requests.

10. The system of claim 6, wherein each of the texture data storage footprints comprises a plurality of texel storage slots.

11. A method of retrieving texture data entries from a texture data storage unit for a graphics rendering system, the method comprising the steps of:

receiving a plurality of texture data entry requests;

determining a texture data adjacency;

aggregating the plurality of requests to create an aggregated request;

simultaneously retrieving a plurality of texture data entries in response to the aggregated request, wherein the step of simultaneously retrieving includes tagging stored texture data likely to be requested.

12. The method of claim 11, wherein the aggregating step comprises combining texel requests for substantially adjacent texels.

13. The method of claim 12, wherein the substantially adjacent texture data are found within a texel storage footprint within the texture data storage unit.

14. A method of encoding texel storage addressing information in a graphics rendering system for processing pixels and texels, each pixel in the system having a plurality of associated texels, the method comprising:

selecting a pixel;

determining the plurality of texels associated with the pixel;

addressing fewer than the total number of the plurality of associated texels;

storing the plurality of associated texels in a storage;

deriving the addresses of the remaining texels from at least one of the addressed texels;

accessing from the storage the plurality of associated texels.

15. The method of claim 14, wherein the deriving step is performed in a manner dependent upon a spatial relationship between the texels associated with the pixel.

16. The method of claim 15, wherein the spatial relationship is derived from a texel within said associated plurality.

17. A computer graphics texture data storage system for providing texture data to a graphics rendering system, the storage system comprising:

a first texture data cache having a first data access structure and a plurality of first texture data cache footprints, the first data access structure being independent of a method for accessing data stored within the first texture data cache footprints;

a second texture data cache having a second data access structure and a plurality of second texture data cache footprints, the second data access structure being linked to a method for accessing data stored within the second texture data cache footprints, wherein the second texture data cache comprises means for tagging stored texture data likely to be requested.

18. The method of claim 17 wherein said first data access structure is less complex than said second data access structure.

19. The method of claim 18 wherein said first data cache is scalable.

20. A computer graphics texture data storage system for providing data to a graphics rendering system, the storage system comprising:

a format conversion unit for converting received graphics data from one graphics format to another, less storage-efficient format;

a data storage unit, wherein the format conversion unit is configured to forward data to the data storage unit, and wherein the data storage unit includes at least one cache footprint, wherein the data storage unit comprises means for tagging stored texture data likely to be requested.

* * * * *

UNITED STATES PATENT AND TRADEMARK OFFICE
CERTIFICATE OF CORRECTION

PATENT NO. : 6,300,953 B1
APPLICATION NO. : 09/173586
DATED : October 9, 2001
INVENTOR(S) : Rivard et al.

Page 1 of 1

It is certified that error appears in the above-identified patent and that said Letters Patent is hereby corrected as shown below:

On the Cover Page, item (73) Assignee, replace "nVidia" with --NVIDIA U.S. Investment Company--;

col. 3, line 63 replace "farther" with --further--;
col. 5, line 2 insert --and-- before "color" and after "314,";
col. 6, line 1 replace "ltoreq..DELTA." with --≤--;
col. 6, line 1 replace "ltoreq..DELTA." with --≤--;
col. 9, line 29 replace "330" with --340--.

Signed and Sealed this

Sixteenth Day of February, 2010

David J. Kappos
*Director of the United States Patent and Trademark Office*